May 26, 1964 — E. R. HAMILTON — 3,134,258
VOLUMETER
Filed June 11, 1959
4 Sheets-Sheet 1
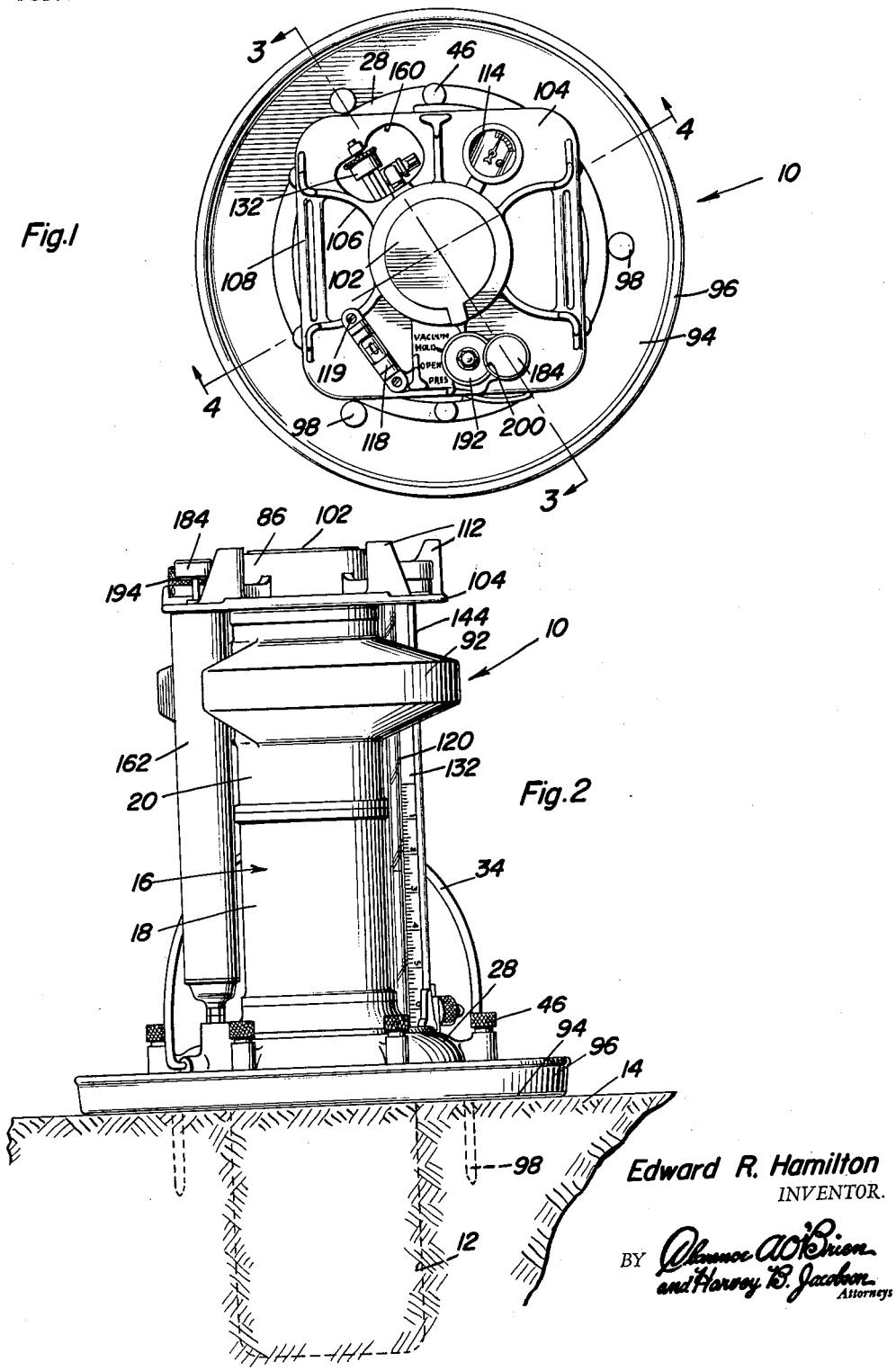
Edward R. Hamilton
INVENTOR.

May 26, 1964  E. R. HAMILTON  3,134,258
VOLUMETER
Filed June 11, 1959  4 Sheets-Sheet 2

Edward R. Hamilton
INVENTOR.

May 26, 1964

E. R. HAMILTON 3,134,258

VOLUMETER

Filed June 11, 1959

Edward R. Hamilton
INVENTOR.

BY Clarence A. O'Brien
and Harvey B. Jacobson
Attorneys

Edward R. Hamilton
INVENTOR.

United States Patent Office 3,134,258
Patented May 26, 1964

3,134,258
VOLUMETER
Edward R. Hamilton, Austin, Tex., assignor to Don A. Hart, doing business as "Rainhart Co.," Austin, Tex.
Filed June 11, 1959, Ser. No. 819,742
17 Claims. (Cl. 73—149)

The present invention generally relates to a measuring device and more particularly to a volumeter or a device to measure the volume of an excavated cavity for purposes of more readily determining the density of a material while it was in place, or in other words, before it was removed from the cavity.

In the construction of highways and other pavements and other various constructions, it is frequently necessary to know the density of a particular material in the place in which the material occurs. This generally is referred to as the "in place density" and is usually expressed in pounds per cubic foot. The weight of the excavated material may be readily determined by weighing the excavated specimen. Normally, the specimen will have its volume changed in the process of removal unless the material permits removal by a driven cylinder which is very rarely possible. Therefore, it is the primary object of the present invention to provide a device for determining the in place volume of the specimen by measuring the volume of the cavity created by removal of the specimen.

In previous attempts to accomplish this purpose, the quantity of a high viscosity fluid needed to fill the cavity has been measured but this is unsatisfactory due to unknown quantities of the fluid escaping into the material. Further, it is difficult to determine when the cavity is exactly filled and the fluid also contaminates the test site. The volume has also been measured by the quantity of graded and calibrated sand or other solids needed to fill it and this was frequently impractical because of the inconveniences of grading and calibrating the material and the change in its characteristics with the change of moisture and the change in characteristics due to handling and other factors. Another disadvantage of this previous arrangement was the weight and bulk of material needed and also the high cost of material and very poor accuracy under some conditions.

In recent years, various agencies dealing with highways and roads started to use a so-called "rubber balloon" method in which the cavity volume is measured by the amount of fluid required to expand a balloon hydrostatically until the balloon and contained fluid completely fills the cavity. There are several volumeters employing these balloons and one type of balloon is shown in U.S. Patent No. 2,606,442 granted on August 12, 1952. These balloons were initially inflated by lung power but in some instances, the use of a pump device has been employed. The various devices presently available have certain factors which renders them disadvantageous. One of the factors involved is that all of the presently available volumeters require arithmetical computations in order to determine the volume of the cavity thus introducing the possibility of error which would render an erroneous result and could prove quite costly.

The present invention incorporates generally a metal fluid chamber connected to a transparent gauge tube mounted beside it to indicate the average fluid level in the chamber. The present device also incorporates structural features which enable the volumeter to be employed even though the test site is not level. The invention also incorporates a movable graduated tape so that the zero point of the tape can be set and locked at the proper height to exactly correspond with the meniscus in the gauge tube thus permitting a direct reading on the tape for indicating the test hole or excavation volume.

The present invention also incorporates a valve at the base of the gauge tube which may be opened or closed whereby the fluid level is locked for preserving the reading in the gauge tube so that the device may be removed from the test site and read more easily.

The present invention also incorporates the concept of different balloon diameter for different size cavities so that the balloon will not be extended to a point near its elastic limit thus eliminating the possibility of the balloon bridging over corners, cavities or the like. Higher balloon efficiencies are obtained along with resulting higher accuracies, by being able to adjust the effective balloon length. Also, volume flexibility is accomplished by using different or additional chambers with the same basic unit.

Another feature of the present invention is to provide a volumeter which is simple in construction, easy to use, accurate, adapted for use with various size excavations or cavities, and highly effective for its particular purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the volumeter of the present invention;

FIGURE 2 is a side elevation of the volumeter illustrating the device position for operation;

Figure 3:
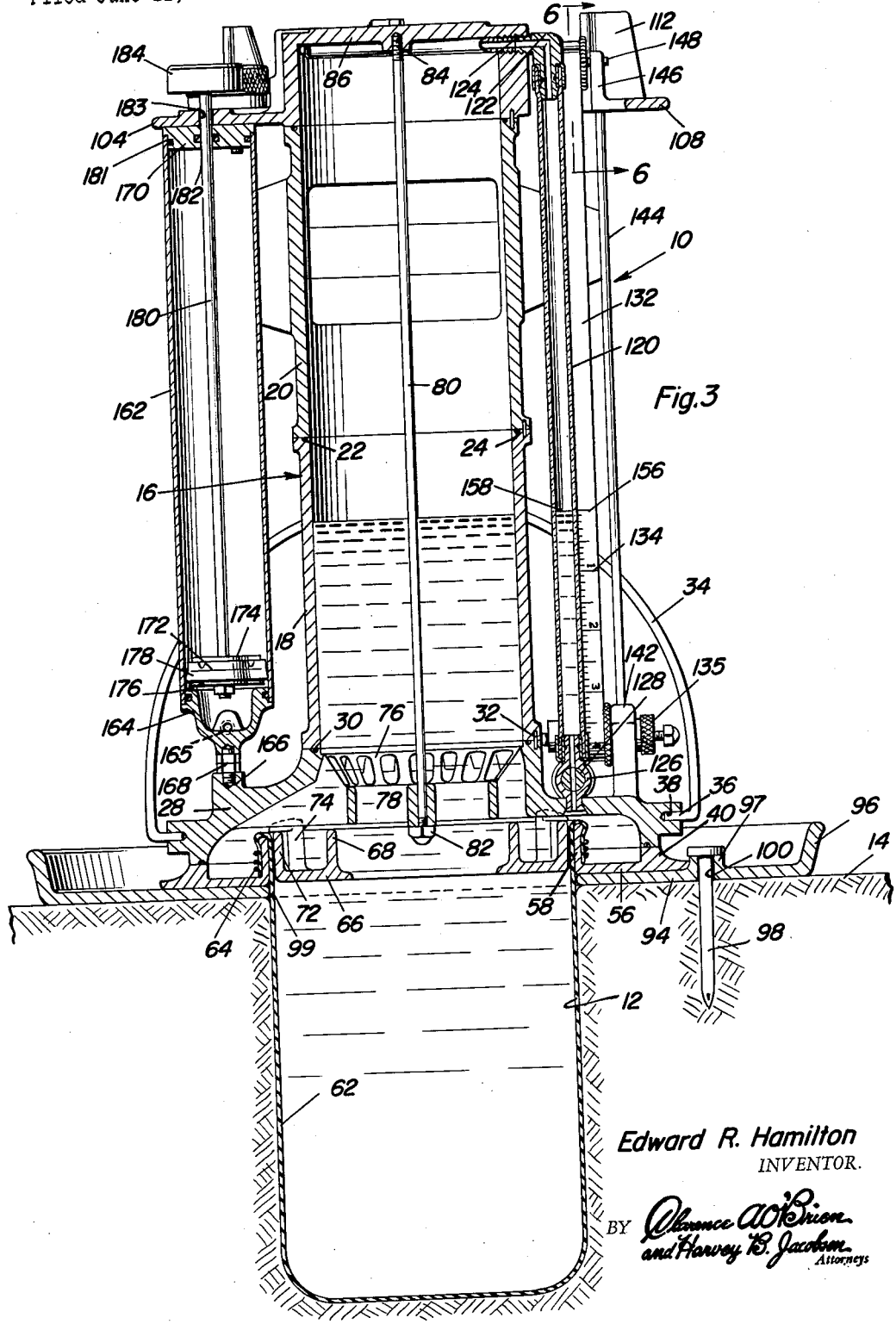
FIGURE 3 is a longitudinal, vertical sectional view taken substantially upon the plane passing along section line 3—3 of FIGURE 1 illustrating the details of construction of the invention including the pump, the gauge tube, the tape and the internal construction of the cylinder.

Referring now specifically to the drawings, the numeral 10 generally designates the volumeter of the present invention employed for measuring the volume of a test hole or excavation 12 in the ground surface 14 so that the volume of the test hole or excavation will be known and the weight of the material being known or easily determined, the density of the material while "in place" may be readily determined.

The volumeter includes a generally elongated cylindrical chamber generally designated by numeral 16 and including a lower cylindrical chamber section 18 and an upper cylindrical chamber section 20 both of which are calibrated to a predetermined size and are joined together by a peripheral seal 22 and a plurality of dowel pins 24. The lower end of the cylindrical chamber 16 rests upon a hollow base or bottom 28 which flares outwardly and which is sealed to the lower cylindrical chamber section 18 by virtue of a seal 30 and a plurality of dowels 32. An elongated and generally U-shaped wire bale 34 is attached to the base or bottom 28 by virtue of inturned ends 36 received in sockets 38 thus pivotally attaching the bale 34 to the base 28.

Detachably connected with the lower end of the bottom 28 is an adapter or base 40 which somewhat is in the nature of a circular plate and is held in sealed relation by a seal 42 and a plurality of screw-threaded fastening bolts 44 having knurled heads 46 and threaded lower end portions 48 which engage with internally threaded apertures 50 in the base 40 and which are slidably received in cylindrical bores 52 in the bottom 28 with the upper end of the cylindrical bores 52 having an internally threaded portion 54 whereby the bolts 44 may be unscrewed from the threaded apertures 50 and pulled upwardly and then turned into the threads 54 so that the bolts 44 will be retained in retracted position thus enabling movement of the bottom 28 in relation to the base 40 for aligning the bottom and base and for providing effective sealing engagement of the seal 42.

The base 40 is provided with an inwardly extending horizontal annular portion 56 which terminates in an upwardly extending flange 58 having a rounded upper edge 60. An inflatable balloon 62 which is adapted to extend into the test hole 12 has the upper end thereof turned downwardly over the rounded upper edge 60 of the flange 58 and the upper end of the balloon 62 is then secured to the flange 58 by virtue of a tie string 64 which may be in the form of a snare loop or the like. The rounded edge 60 forms an abutment for preventing the string or loop 64 to pass over the top edge of the flange 58 thus anchoring the balloon to the base 40 in fluid tight relation.

By removing the base 40 and placing another base under the bottom 28, flanges 58 having different diameters may be provided thereby permitting the device to be used with balloons having different diameters for permitting use of the device for measuring test holes of different diameters whereby the balloon when in a collapsed state will have a diameter generally equal to the diameter of the test hole so that the balloon will not be extended to a point near its elastic limit which may cause the balloon to bridge over sharp corners, cavities or the like.

Figure 4:
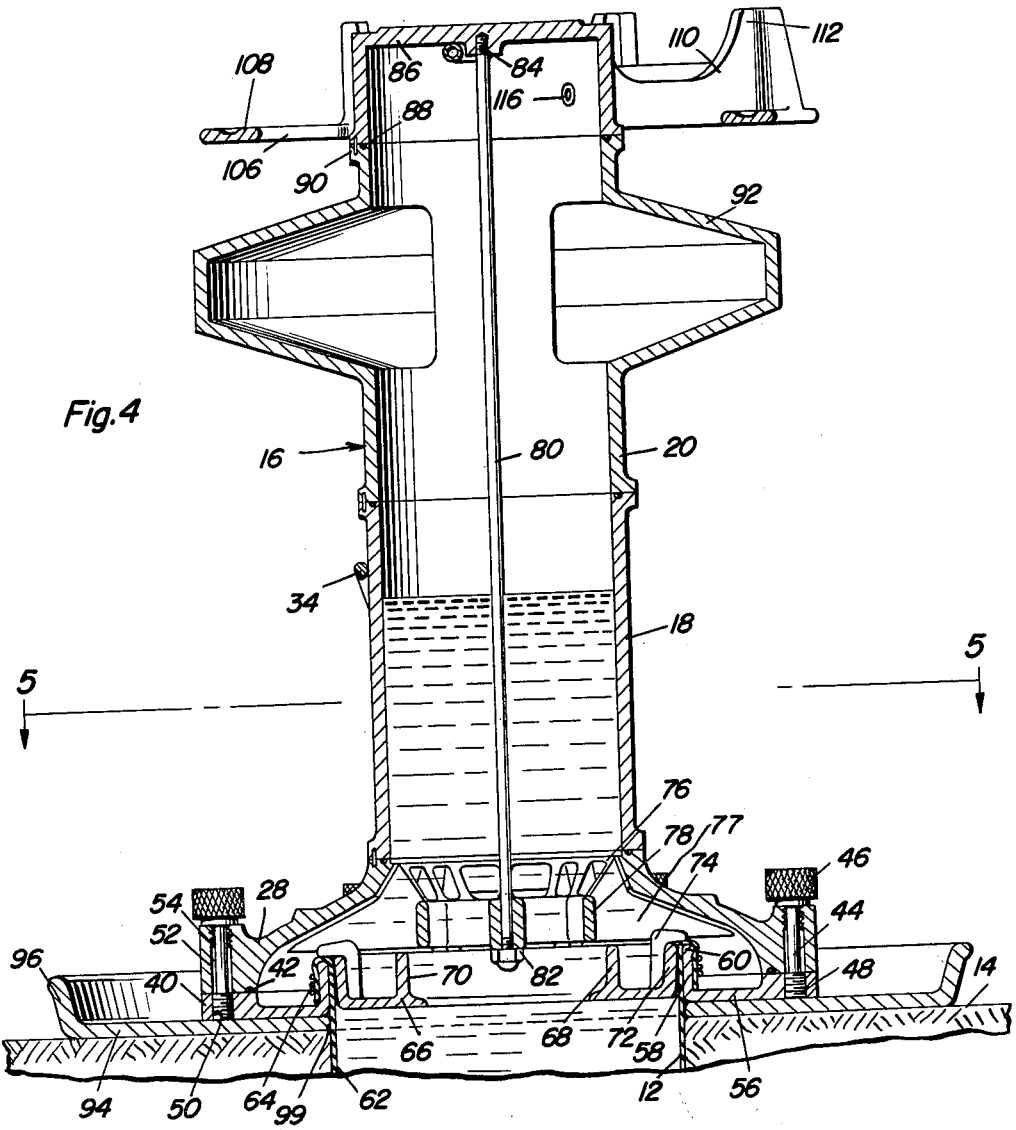
FIGURE 4 is a vertical sectional view taken substantially upon a plane passing along section line 4—4 of FIGURE 1 illustrating further structural details of the invention.
Figure 6:
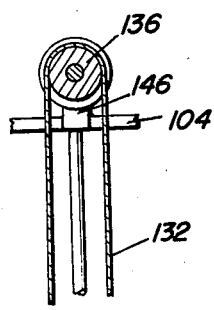
FIGURE 6 is a detailed sectional view taken substantially upon a plane passing along section line 6—6 of FIGURE 3 illustrating the structural details of the mechanism for adjusting the measuring tape.
Figure 5:
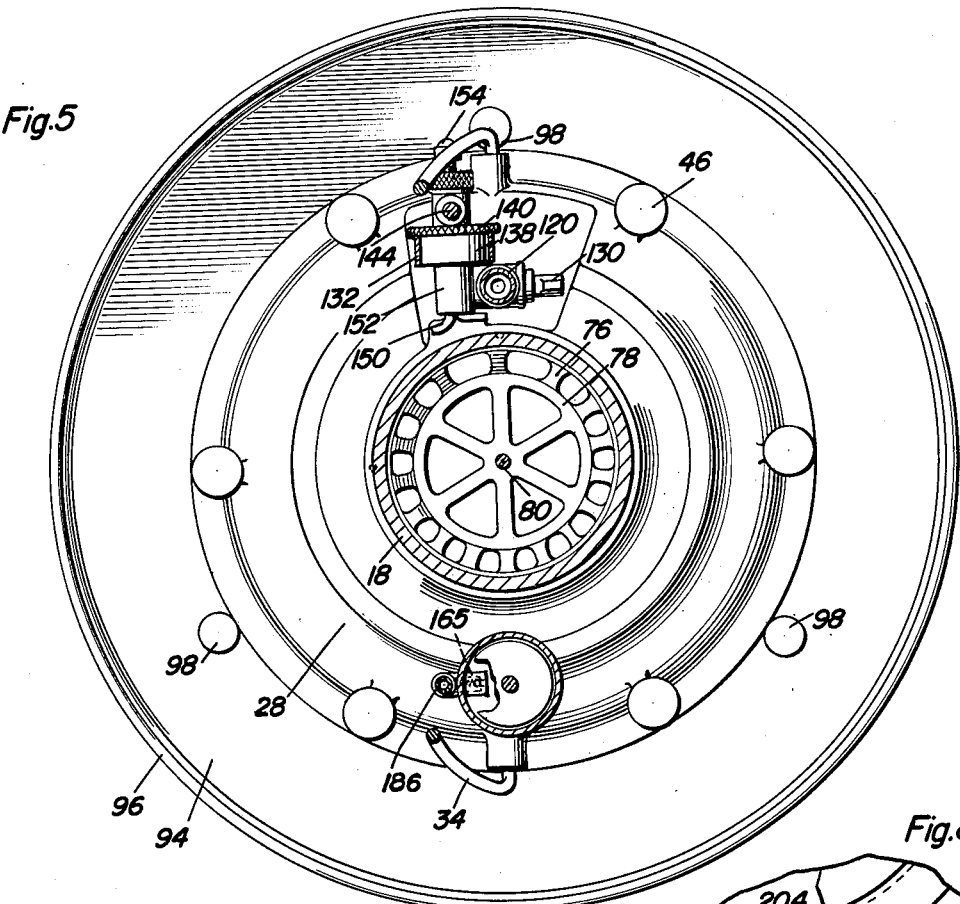
FIGURE 5 is a transverse, plan sectional view taken substantially upon the plane passing along section line 5—5 of FIGURE 4 illustrating further structural details of the volumeter.
Figure 7:
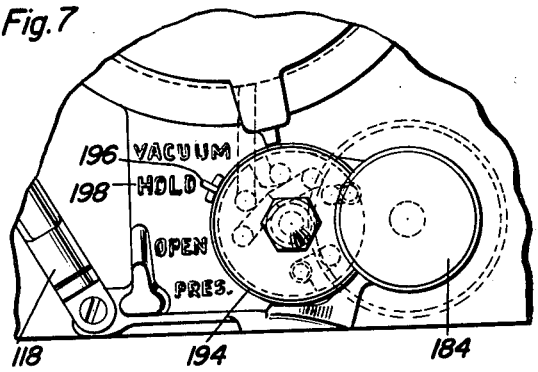
FIGURE 7 is a fragmental enlarged plan view of the pump and the interlocking control valve.

Supported from the top edge of the flange 58 having a rounded upper edge 60 is a circular trough-like member 66 having several holes therein and which has an upturned cylindrical flange 68 defining an opening 70. Also, there is an outer upturned flange 72 concentric with the flange 68 and spaced radially outwardly therefrom. Secured to the inner surface of the flange 72 is a plurality of circumferentially spaced L-shaped hook members 74 which extend outwardly and rest against the upper edge of the flange 58 or rather on that part of the balloon 62 which passes over the rounded edge 60. The opening or cavity defined by the opening 70 provides a space for the storage of the balloon when in retracted position but does not alter the calibration of the interior volume of the device. A generally downwardly tapering conical grillwork member 76 is attached to the upper end of the bottom 28 and extends downwardly and terminates in a spider member 78 which prevents the balloon from passing upwardly into the interior of the bottom 28 or the interior of the chamber 16. As illustrated in FIGURE 4, the spider member 78 is provided with a plurality of radial vanes 77 in overlying relation to the flanges on the trough member 66.

An elongated tie rod 80 extends downwardly through the center of the spider 78 and is provided with a cap nut 82 which retains the elements of the invention in assembled relation. The upper end of the tie rod 80 is screw threaded into a threaded socket 84 in the top of a generally cylindrical cap 86 which is sealed with the upper chamber section 20 by a seal 88 and dowel pins 90. When less volume is needed, an upper chamber similar to section 18 having straight walls may be substituted for the upper chamber having radially outwardly projecting hollow sections 92 which increases the volume of the calibrated chamber 16.

Underlying the base 40 is a circular plate 94 in the form of a tray having an upwardly extending peripheral flange 96 and having a central opening 99 with a diameter equal to the diameter of the test hole 12. The upper surface of the tray or plate 94 is smooth and supportingly receives the base 40 within three raised bosses 97 for keeping base 40 concentric with central opening 99 during any rotation of volumeter. For anchoring the tray 94 in position, driven fasteners 98 are employed which extend through openings 100 in the tray 94. The tray 94 prepares the test hole site and the tray is selected so that the diameter of the opening 99 will be substantially equal to the diameter of the test hole and also substantially equal to the diameter of the balloon 62.

The cap 86 is provided with a smooth circular central surface 102 which provides a knee pressure point for providing a surcharge pressure to the device when measuring the volume of a test hole. Also, the cap 86 is provided with a generally horizontally disposed plate member 104 which has arcuate openings 106 on opposite sides thereof with transverse handle members 108 extending across the outer edge of the opening 106 for forming handles for ease of carrying of the device. Also, the plate 104 is provided with reinforcing gussets 110 some of which terminate in horizontally disposed supporting legs 112 that are disposed slightly above the flat surface 102 thus forming spaced points of support for the device when in inverted position, such as when filling the bottom end of the calibrated chamber 16 to a desired level.

The wall of the cap is provided with a pressure gauge 114 communicating with the interior of the chamber for indicating the pressure within the chamber. The inner end of the gauge 114 is seen in FIGURE 4 and is designated by numeral 116. Also mounted on the plate 104 is a spirit level assembly 118 that is attached by suitable fasteners 119 to a support in such manner that its longitudinal axis parallels the bottom plane of base 40 and also parallels the line through the center of the gauge tube 120 and the calibrated chambers 16 and 20.

As shown in FIGURE 3, a transparent tube of glass, plastic or the like designated by numeral 120 is disposed alongside of the chambers 16 and 20 in parallel relation to the longitudinal axes thereof. The upper end of the tube 120 is provided with a right angled adapter 122 sealed in relation thereto and extending into the interior of the cap 86 by virtue of a screw-threaded connection 124. The lower end of the tube 120 is sealingly engaged with one end of a valve body 126 in which the other end thereof communicates with the hollow interior of the bottom 28 and the valve body 126 is provided with a petcock type valve 128 having a handle 130 for operation thereof.

Disposed alongside of the tube 120 is an elongated endless flexible tape 132 preferably constructed of metal and having graduated indicia 134 thereon consisting of graduations and numerical indicia. The tape 132 is journalled on an upper roller 136 and a lower roller 138 both of which are provided with a knurled peripheral projection 140 for operation and rotation thereof. Attached to the bottom 28 is an upstanding bracket 142 having an elongated rod 144 extending upwardly therefrom and connected with the top plate 104 directly under an upstanding bracket 146. The bracket 146 supports a shaft 148 for the upper roller 136 which also extends into the cap for journalling the roller 136. The lower roller 138 is journalled on a shaft 150 which also extends through a support bracket 142. Threaded inwardly onto the shaft 150 on the outer end thereof is a cap nut 154 and a knurled lock nut 155. The shaft 150 is made like a cotter key on the inner end thereof and extends through a spacer 152 which engages the lower roller 138 and the spacer 152 may actually be integral with the roller 138. Thus, the lock nut 155 enables frictional pressure to be exerted onto the shaft and thus locking the roller 138 so that the index line 156 on the flexible tape 132 may be aligned with the meniscus 158 in the gauge tube and then locked in position so that the differential between the initial position and the final position of the meniscus may be easily read by direct reading on the calibrated scale.

The scale may be provided with a stretchable resilient insert for maintaining tension on the rollers and for also preventing slippage of the tape. Where the upper roller and the upper end of the gauge tube are disposed, the top plate 104 may be provided with an enlarged opening 160 to facilitate assembly and disassembly of the device, to facilitate readings without obstruction and also to facilitate grasping engagement with the top roller knurled flange for operation of the tape.

Figure 8:
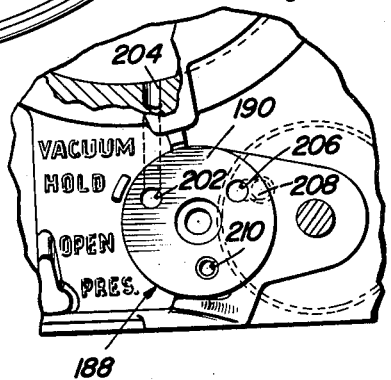
FIGURE 8 is a view similar to FIGURE 7 with some of the components removed.
Figure 9:
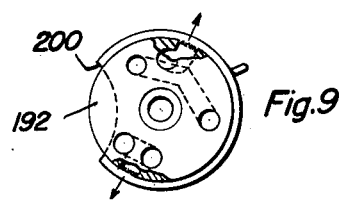
FIGURE 9 is a view showing the valve mechanism for the device.

Mounted alongside the calibrated chamber 16 in parallel relation thereto is an elongated pump cylinder 162 sealed to a lower end member 164 that is affixed to a boss 166 on the bottom 28 by a height adjustable fastening member 168. The member 164 is also provided with a check valve 165 in a passageway therein. The upper end of the cylinder 162 is provided with a closure plug 170 in sealed relation thereon and the plug 170 is engaged under a portion of the plate 104. A piston 172 is reciprocably mounted within the cylinder 162 and the piston is provided with spaced members 174 and 176 which receive therebetween the cup-shaped seal ring 178 which also serves as a check valve. Connected with the piston 172 is an elongated piston rod 180 which extends upwardly through a passageway 182 in the plug 170 sealed to rod 180 by sealing ring 181 and also upwardly through an aperture 183 in the top plate 104. The upper end of the piston rod 180 terminates in a generally cylindrical handle or knob 184 whereby reciprocation of the knob 184 will cause reciprocation of the piston 172 thus pumping air out from the lower end of the piston through a tube 186 into a valve generally designated by numeral 188 which includes a valve seat 190 and a rotatable valve member 192 with a knurled upper section 194 that is mounted thereon. The valve member 192 is provided with a projection 196 for pointing out indicia 198 imprinted on the plate 104. The valve member 192 is provided with an arcuate notch 200 for receiving the periphery of the operating knob 184 for the air pump. It is noted in FIGURE 8 that the valve seat 190 has an opening 202 communicating with a passageway 204 for communicating the valve body with the interior of the chamber 16. The valve seat 190 is also provided with another aperture 206 communicating with the upper end of the cylinder 162 by virtue of passageway 208. A third aperture 210 is provided in the valve seat 190 which is in communication with the pressure line 186 from the lower end of the cylinder. The valve member 192 is provided with passageways for alignment with and communication with certain of the apertures or openings 202, 206 and 210 for directing air pressure in a desired manner. Thus, by actuating the pump and orienting the valve in the proper manner, the chamber may be subjected to a vacuum thus deflating the balloon and pulling it into the hollow area provided therefor at the lower end of the volumeter. The pump may be used to pressurize the chamber for forcing the fluid downwardly and inflating the balloon in one position of the valve and the chamber 16 may be opened or vented to the atmosphere or the valve may be disposed in such a manner that it will hold whatever pressure or vacuum there is in the chamber.

In using the present device, there may be a chart provided to indicate the proper selection of base and matching balloon for the selected range of the test hole diameter. The balloon should be thoroughly cleaned and if a different test hole capacity range is needed or desired, a different upper chamber section may be employed having a different volume. The pump handle is then depressed until it bottoms which also safely interlocks the control valve on "hold" which will prevent fluid from escaping or entering the pump. The device is then inverted and set solidly on the six legs and the thumb screws holding the base are removed. After making sure that there are no foreign materials in the device, very clean and pure water is poured into the device and an ethylene glycol anti-freeze may be used. The excess balloon may be folded over at the free end thereof and the bolloon is then installed on the base in an obvious manner. The base is then placed on the device and secured thereto by the thumb screws. The thumb screws are only finger tightened. While holding the balloon in the base cavity with one end, the device is shifted to vacuum for retracting the balloon against the grill in the bottom of the device.

In preparing the test hole site, the site should be reasonably flat and free of sharp surface projections and not inclined more than 20 degrees. The accessory tray is used and is spiked down in an obvious manner which provides a more accurate working base for the volumeter.

The volumeter tape is graduated in standard lineal feet, tenths and hundreths and in view of the calibration, one-tenth of the lineal reading is a volume of the test hole in cubic feet.

The memory valve or petcock must necessarily be open preferably on a tray and subsequently rotate the volumeter until the level bubble moves to the center. Then place one knee over the top or on the smooth surface of the top and apply as much weight as possible on the central top area. The pump handle may then be released and shift the control valve to the open position. When the fluid in the gauge tube comes to rest, the control valve is then shifted to the pressure position and the pump is pumped until the compound gauge registers that pressure which will fully expand the balloon in the test hole without enlarging the hole significantly. While maintaining surcharge, close the memory valve with the left hand until the valve handle is horizontal, shift the control valve to the open position and when no longer is there any air exhausting the control valve may be placed in the vacuum position and the pump operated slowly until a slight vacuum had been registered on the baloon. Then, the knee may be removed. The volumeter and the tape are adjusted by moving the tape to align the index line of the tape with the meniscus in the gauge tube. The memory valve is then opened.

It is pointed out that even if the chamber is inclined, there are two locations where the gauge tube would read a true statement of volume, that is, on either side at a position where a plane passing through the center of the gauge tube and through the center of the chamber is at right angles to the incline. In this position, the excess water in one side of the slanted chamber will exactly equal the reduced water in the other. Then the entire chamber may be rotated and the gauge tube can be brought to the above correct reading position. In order to accomplish this, a spirit level has been mounted in such a manner that its longitudinal axis is parallel the bottom plane of base 40 and also parallel the line through the center of the gauge tube 120 and the center of the calibrated chambers 16 and 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a fluid chamber, means for anchoring said chamber to the ground surface and mounting said chamber for rotation about a substantially vertical axis, an externally connected gauge tube having an axis parallel with the axis of the chamber, a spirit level carried by the chamber with the longitudinal axis of the spirit level being parallel with the bottom plane of the chamber and also being parallel with a longitudinal plane passing through the center of the chamber and through the center of the gauge tube thereby forming means for accurately determining the true average level of fluid in the chamber even if its inclined by rotation of the chamber until the bubble in the spirit level is centered thereby allowing the gauge tube meniscus to read the true average fluid level in the chamber even when it is inclined.

2. In a volumeter, a gauge tube, a movable scale mounted for movement alongside of the gauge tube for aligning an index line of the scale with the meniscus of the gauge tube, knob means at each end of the tube for moving the scale and means for locking the scale in adjusted position, said gauge tube being provided with a cut-off valve for holding the position of fluid in the gauge tube so that the device may be moved to a convenient position for reading.

3. A volumeter comprising a generally cylindrical calibrated chamber, an expansible balloon mounted on the lower end of said chamber in fluid tight relationship thereto and in communication therewith, an air pump for pressurizing the chamber from the upper end thereof, a quantity of liquid in the chamber, a gauge tube disposed exteriorly of the chamber, a scale alongside of the gauge tube for measuring the elevational change of the liquid in the gauge tube, said gauge tube being communicated with the upper and lower ends of the chamber whereby the volume of liquid moved from the chamber into the balloon may be accurately measured, and level means mounted on said chamber for indicating the horizontal condition of a straight line passing through the center of the chamber and the center of the tube and perpendicular to the longitudinal axis of the chamber and tube thereby accurately determining the volume of displaced liquid even when the chamber is inclined.

4. The structure as defined in claim 3 wherein said gauge tube is provided with a valve at the lower end thereof whereby the elevation of the liquid in the tube may be held by closing the valve so that the liquid elevation in the gauge tube may be read at a later time.

5. The structure as defined in claim 3 wherein said scale is longitudinally movable so that the index line of the scale may be aligned with the meniscus of the liquid in the gauge tube for providing a direct reading on the scale.

6. The structure as defined in claim 3 wherein said chamber is provided with a hollow base member, an adapter tray underlying the base member for engagement with the surface in surrounding relation to the test hole, said tray having an aperture generally equal to the diameter of the test hole and generally equal to the diameter of the balloon.

7. A volumeter comprising a generally cylindrical calibrated chamber, an expansible balloon mounted on the lower end of said chamber in fluid tight relationship thereto and in communication therewith, an air pump for pressurizing the chamber from the upper end thereof, a quantity of liquid in the chamber, a gauge tube disposed exteriorly of the chamber, and a scale alongside of the gauge tube for measuring the elevational change of the liquid in the gauge tube, said gauge tube being communicated with the upper and lower ends of the chamber whereby the volume of liquid moved from the chamber into the balloon may be accurately measured, said chamber being provided with a spider-like framework in the lower end thereof for preventing entry of the balloon into the chamber thereby preventing error from this cause.

8. The structure as defined in claim 3 wherein said chamber is provided with a U-shaped bail attached to the lower end thereof and supporting legs on the upper end thereof whereby the chamber may be inverted for purposes of pouring liquid into said chamber or for carrying purposes.

9. In a volumeter having a fluid chamber and base with a balloon attached thereto, a tray having a generally circular plate with an enlarged opening for alignment with a test hole and receiving the balloon, said plate having a plurality of upwardly projecting bosses having apertures extending therethrough for receiving anchor members, said bosses being spaced for closely receiving the base for positioning the base centrally of the opening in the tray.

10. A volumeter comprising a generally cylindrical calibrated chamber, an expansible balloon mounted on the lower end of said chamber in fluid tight relationship thereto and in communication therewith, an air pump for pressurizing the chamber from the upper end thereof, a quantity of liquid in the chamber, a gauge tube disposed exteriorly of the chamber, and a scale alongside of the gauge tube for measuring the elevational change of the liquid in the gauge tube, said gauge tube being communicated with the upper and lower ends of the chamber whereby the volume of liquid moved from the chamber into the balloon may be accurately measured, said chamber being provided with a spider member in the lower end thereof for preventing entry of the balloon into the chamber, a trough-like member disposed in the mouth of the balloon, means supporting the trough-like member to prevent outward movement thereof, and a plurality of radial vanes extending outwardly from the spider member to prevent upward movement of the trough-like member, said trough-like member having an enlarged opening therein for communication with the interior of the balloon and maintaining the volume above the balloon constant regardless of the size of the balloon.

11. The structure as defined in claim 10 wherein said chamber is provided with an inwardly extending peripheral flange in the bottom thereof, an upstanding flange on the inner edge of the inwardly extending flange, said flange having an outwardly extending bead at the top edge, said balloon being disposed over the top edge of the upstanding flange and bead, means securing the balloon to the upstanding flange, said upstanding flange adapted to supportingly engage the trough member for supporting the trough member against outward movement.

12. A volumeter comprising a generally cylindrical calibrated chamber, an expansible balloon mounted on the lower end of said chamber in fluid tight relationship thereto and in communication therewith, an air pump for pressurizing the chamber from the upper end thereof, a quantity of liquid in the chamber, a gauge tube disposed exteriorly of the chamber, a scale alongside of the gauge tube for measuring the elevational change of the liquid in the gauge tube, said gauge tube being communicated with the upper and lower ends of the chamber whereby the volume of liquid moved from the chamber into the balloon may be accurately measured, and leveling means mounted on said chamber for indicating the horizontal condition of a straight line passing through the center of the chamber and the center of the tube and perpendicular to the longitudinal axis of the chamber and tube thereby accurately determining the volume of displaced liquid even when the chamber is inclined, said chamber being provided with a spider-like framework in the lower end thereof for preventing entry of the balloon into the chamber.

13. The structure as defined in claim 12 wherein said chamber is provided with a U-shaped bail attached to the lower end thereof and supporting legs on the upper end thereof whereby the chamber may be inverted for purposes of pouring liquid into said chamber or for carrying purposes.

14. The structure as defined in claim 12 together with an adapter tray underlying said base, said tray having an opening having a diameter substantially equal to the diameter of a test hole.

15. The structure as defined in claim 14 wherein said tray is provided with upwardly projecting apertured bosses, anchor members extending through the bosses for anchoring the tray to the ground surface, said bosses being equally spaced radially from the center of the tray for receiving the base of the chamber for positioning the center of the opening in the tray in alignment with the center of the base and chamber.

16. The structure as defined in claim 15 wherein the uninflated dimensions of the balloon approximate the interior dimensions of the test hole thereby requiring less pressure and stretching of the balloon to fill the test hole without enlarging the test hole thereby retaining the material highly flexible to conform to irregularities in the surface of the test hole and preventing puncture of the balloon thereby increasing the accuracy of the test reading.

17. The method of determining the average fluid level in a fluid chamber for measuring the change in the volume of fluid without levelling the chamber comprising the steps of orientating a gauge tube with the longitudinal axis thereof parallel with the axis of the chamber, orientating a spirit level with the longitudinal axis parallel with the bottom plane of the chamber and parallel with a longitudinal plane passing through the longitudinal axes of the tube and chamber, rotating the chamber until the bubble in the spirit level is centered without regard to inclination of the chamber about the longitudinal axis of the spirit level, and directly reading the true average fluid level by observing the gauge tube meniscus.

References Cited in the file of this patent

UNITED STATES PATENTS

| | | |
|---|---|---|
| 1,277,760 | Seraphin | Sept. 3, 1918 |
| 1,784,973 | Preston | Dec. 16, 1930 |
| 1,922,049 | Jensen | Aug. 15, 1933 |
| 2,354,327 | Mayer | July 25, 1944 |
| 2,877,647 | Handy et al. | Mar. 17, 1959 |
| 2,916,916 | Holsclaw | Dec. 15, 1959 |
| 2,924,096 | Humphres | Feb. 9, 1960 |

FOREIGN PATENTS

| | | |
|---|---|---|
| 363,056 | Italy | Sept. 16, 1938 |

OTHER REFERENCES

Public Roads, February 1942, vol. 22, No. 12, page 280.